April 19, 1960 R. E. HUPP 2,933,644
DIGITAL COUNTER FREQUENCY MONITOR
Filed April 24, 1959
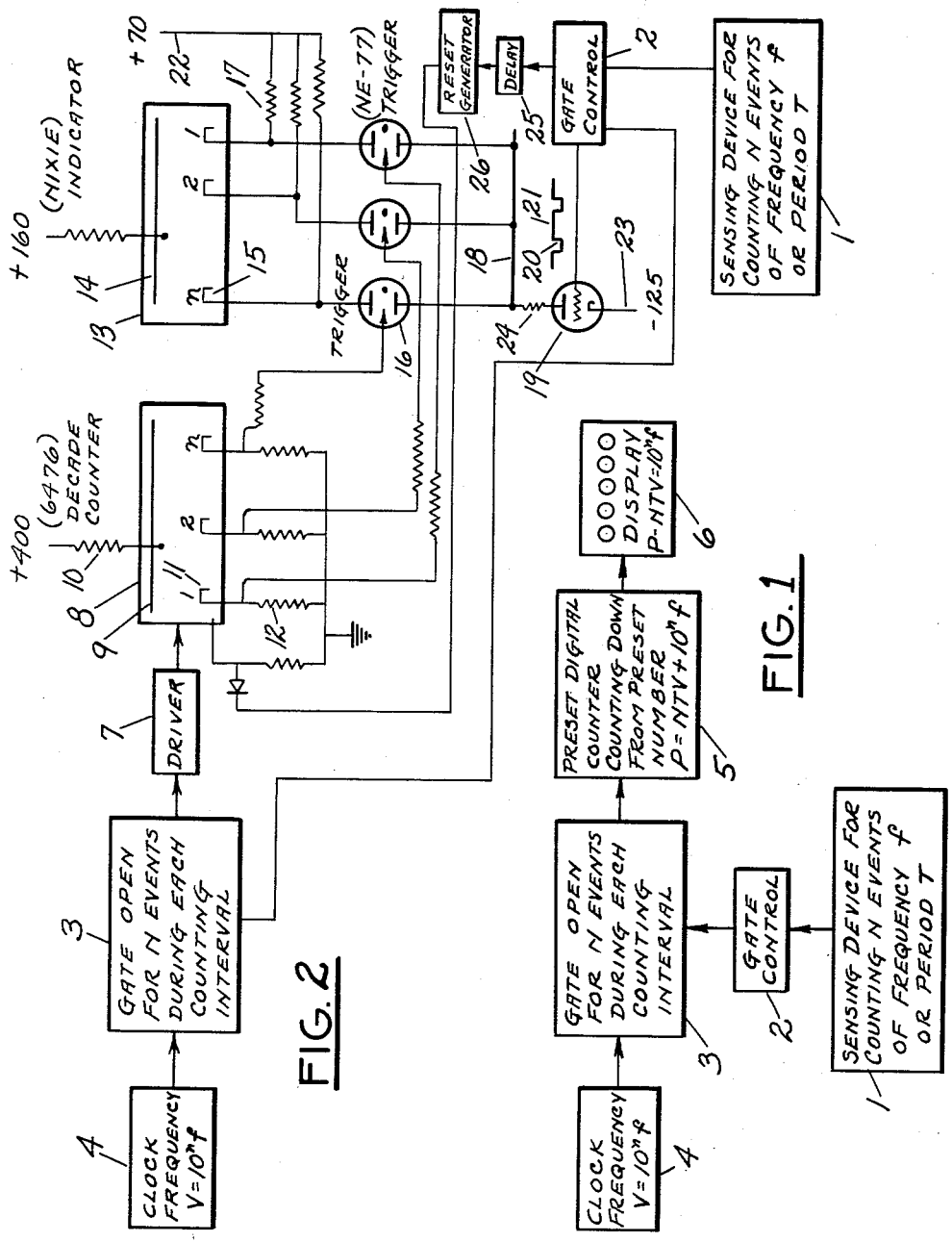
INVENTOR.
Ross E. Hupp
BY
Ralph Hammar
Attorney

United States Patent Office 2,933,644
Patented Apr. 19, 1960

2,933,644
DIGITAL COUNTER FREQUENCY MONITOR

Ross E. Hupp, Los Angeles, Calif., assignor to Erie Resistor Corporation, Erie, Pa., a corporation of Pennsylvania Application April 24, 1959, Serial No. 808,840

8 Claims. (Cl. 315—84.5)

This invention is a digital counter having a direct reading display which remains on during each counting interval to display the results of the previous count and is changed at the end of each counting interval to display the new information. One use of the counter is in the monitoring of low frequencies to a high degree of accuracy by having the counter on for N cycles of the frequency to be monitored and gated to count the cycles of a high frequency clock passing through the gate during the on period. The counting is down from a preset number chosen so that when the monitored frequency is exactly what it should be, the resulting number displayed is equal to the monitored frequency to the desired number of decimal places. If the monitored frequency is less (or more) than it should be, more (or less) cycles of the clock frequency will pass through the gate and the resultant number will be less (or more), indicating that the monitored frequency is less (or more) than it should be.

In the accompanying drawing, Fig. 1 is a diagram of the counter used for events occurring at a frequency to be monitored, and Fig. 2 is a circuit diagram of the storage and display unit.

In the drawing, a device 1 senses events which occur at a frequency $f$ or with a period $T$. In a typical application, the frequency $f$ might be 400 cycles per second. The accuracy of a frequency measurement using usual counting techniques is limited to plus or minus one count in the number of events counted so that it is difficult to obtain a high degree of accuracy for events occurring at a low frequency unless the counting interval is made objectionably long.

The sensing device 1 controls a gate control 2 which opens a gate 3 for N events during each timing interval. When the gate 3 is opened, cycles of frequency V from a high frequency clock 4 pass through the gate and are counted by preset counter 5 and displayed on display unit 6.

As an example of the operation, in monitoring events having a frequency of 400 events or cycles per second over a one second counting interval and to an accuracy of two decimal places, the clock frequency V could be 40,000 cycles per second so that when the monitored frequency is exactly what it should be, 40,000 cycles of clock frequency will pass through the gate during each counting interval and be counted by the preset counter 5. With the counter preset to count down from 80,000, the resulting count at the end of the counting interval will be 80,000 minus 40,000 which will be 40,000 or 400 to two decimal places. If the event rate drops to 399 per second, the gate 3 which is still open for 400 events is open for more than a second (400/399 seconds) and more cycles of the clock frequency will go through the counter, resulting in a final count of 39,900. Similarly, if the event rate rises to 401 per second, the gate which is still open for 400 events will be open for less than a second (400/401 seconds) and less than 40,000 cycles of the clock frequency will pass through the counter resulting in a count of 40,100. As the monitored frequency moves farther away from its desired value, the accuracy of display decreases, but by the use of a calibration table, the true frequency can be accurately determined.

In the simplified circuit diagram of Fig. 2, the gate 3 is open during each counting interval for N events or for a length of time equal to NT where T is the period of each event. During this time NTV cycles of clock frequency pass through the gate to driver 7 for a preset decade counter having as many decade counter tubes 8 (e.g. type 6476) as there are digits to be counted during the counting interval. Each of the counter tubes has its anode 9 connected to a high voltage through a resistor 10 and has ten cathodes 11, each connected to ground through a cathode resistor 12. As is well understood, in each counter tube a glow moves from cathode to cathode sequentially and upon reaching the tenth cathode sends a driving impulse to the counter tube in the next order of digits where the same kind of action takes place. The information accumulated in the decade counter tubes 8 is displayed by an indicator tube 13 (e.g. NIXIE) having its anode 14 connected to the power supply and having ten cathodes 15. Although only one decade counter tube and one indicator tube are shown in the drawing, it will be understood that there are as many of each as there are digits to be counted. Each of the ten cathodes 15 of the indicator tube 13 is connected to the control electrode (grid) of an associated gas trigger tube 16 whose anode is connected to a positive voltage supply through a resistor 17. The voltage of the common trigger tube cathode line 18 is controlled by a gate tube 19 having its anode connected to the trigger tube cathode line, through a series resistor 24 its cathode connected to a negative voltage supply, and its grid connected to the gate control 2. The trigger tubes 16 are grid-controlled cold-cathode gas triodes (e.g. NE–77 or type 5823), which fire only upon the coincidence of an adequate trigger voltage applied to the grid and an adequate voltage across the tubes. Until both of these conditions coincide, the trigger tube does not fire. Once a trigger tube has fired, its grid no longer has any control function and the tube will remain conducting until the voltage across the tube drops below a threshold value which is a voltage less than that required to fire the tube.

At the end of each counting interval, the gate 3 closes and the glow in each of the decade counter tubes 8 rests on one of the cathodes 11 corresponding to the digit counted so that each counter tube contains the information for a single digit of the sum counted. Since the gate 3 has been closed, no further information passes through the gate and the counter tubes remain in that condition until the start of the next counting interval. Although a glow appears on one of the cathodes of each of the decade counter tubes 8, the voltage across its associated cathode resistor 12 is insufficient to fire the associated trigger tube 16 because at this instant the voltage across the trigger tube is too low.

Before firing any of the trigger tubes 16 associated with the indicator tubes 13, the gate control tube 19 is pulsed off by a negative pulse 20 applied to its grid. This stops the flow of current through the tube 19 causing the potential of the common trigger tube cathode line 18 to rise to ground and to interrupt or quench the flow of current through any trigger tube 16 which may have been conducting. Immediately following the quenching pulse 20, the gate control supplies to the grid of the gate control tube 19 a positive pulse 21 which opens the gate for the duration of the pulse 21 which lasts until the end of the next counting interval. The positive pulse 21 causes conduction of the tube 19 with the result that there is impressed across the trigger tubes 16 a voltage substantially equal to the sum of the positive voltage at line 22 and the negative voltage at line 23. Although this voltage is impressed across all of the trigger tubes 16, only one of the trigger tubes fires, namely, the trigger tube associated with the cathode 11 of the decade counter on which the glow rests at the end of the counting interval. Upon firing, the voltage at the common trigger tube cathode line 18 rises, lowering the grid to cathode voltage on all of the other trigger tubes. The trigger tube which fires causes illumination of its associated cathode 15 in the indicator 13. While the voltage across the trigger tubes 16 is insufficient to permit firing of another trigger tube, it is sufficient to maintain the trigger tube which has fired in the fired condition and it remains in this condition until quenched by the next negative pulse 20 at the end of the succeeding counting interval.

Note, the pulse 21 which causes the display by the indicator tubes 13 of the results of the preceding count triggers a delay circuit 25 which in turn starts the counting for the next counting interval by opening the gate 3 and resetting the decade counter tubes to zero by reset generator 26. The transfer of voltage from cathode to cathode during counting has no effect upon the display because the voltage across the trigger tubes has been dropped below the firing level. Counting for the next interval starts a short time after the results of the preceding interval has been transferred to the display unit.

In the operation of the system, the gate control 2 opens the gate 3 for N events, thereby permitting NTV cycles of the clock frequency V to pass through the gate and to drive the decade counter tubes 8. The number of cycles of clock frequency which get through the gate is measured by the decade counter tubes by the successive transferring of the glow on the cathodes 11. During the counting, nothing happens to display the condition of the decade counters. At the end of N events, the gate 3 closes, and the decade counter tubes remain in the condition present at the closing of the gate with the glow stationary on the cathode 11 in each counter tube representing the digit counted by that tube. The tubes 8 are preset to a number P equal to NTV plus $10^n$ times the frequency to be monitored where $n$ is the number of decimal places to which the frequency is to be counted. The counter tubes 8 count down from this preset number P so that the digits on the counter tubes 8 at the end of the counting interval represent P minus the number of cycles of clock frequency which passed through the gate 3. After closing of the gate 3, the trigger tubes 16 associated with the indicator tubes 13 are quenched by a negative pulse 20 applied to the gate control tube 19. Quenching of the gate control tube 19 interrupts the flow of current through the trigger tubes 16. Immediately after quenching, a positive pulse is applied to the grid of the gate control tube 19 causing it to conduct and impressing a voltage across all of the trigger tubes adequate for firing provided the associated grid is energized. Since the voltage for energizing the grids of the trigger tubes 16 comes from the cathode resistors 12 in the decade counter tubes 8, only one of the grids of the trigger tubes 16 associated with each counter tube 8 has the required voltage and only that trigger tube fires. Firing of the trigger tube 16 causes illumination of the associated cathode 15 in the indicator tube 13 thereby displaying the count present at the end of the counting interval. Upon firing of one of the trigger tubes associated with an indicator 13, the voltage across the other trigger tubes drops below a threshold value so that thereafter none of the other trigger tubes will fire even though its grid is excited. The display remains on until the end of the next counting interval when the trigger tubes are again quenched by a negative pulse 20.

What is claimed as new is:

1. A digital counter comprising sensing means for counting events of frequency $f$ or period T, a gate controlled to open periodically for counting intervals of N events and then to close, a clock frequency source of frequency V of higher frequency than $f$ connected to pass through the gate whenever open, a digital counter preset to count down from a number P the cycles of clock frequency passing through the gate during each counting interval, where $P=NTV+10^n f$ and $NTV \cong 10^n f$ and where $n$ is equal to the number of decimal places to which the frequency is to be read.

2. In a digital counter having decade counter tubes and corresponding indicator tubes, each with cathodes respectively corresponding to the digits in its decade, each cathode of an indicator tube having a grid controlled gas tube connected between it and a gate and having the grid of the gas tube excited by the corresponding cathode of the counter tube, said gate applying a voltage across the indicator tube and the associated gas tubes sufficient to fire the gas tube excited by the counter tube and to illuminate the associated cathode of the indicator tube, said voltage dropping after firing to a level sufficient to maintain the fired gas tube on and its associated cathode in the indicator illuminated but insufficient to fire any other gas tube even though its grid is excited by the counter tube.

3. A digital counter comprising sensing means for counting events of frequency $f$ or period T, a gate controlled to open periodically for counting intervals of N events and then to close, a clock frequency source of frequency V of higher frequency than $f$ connected to pass through the gate whenever open, a digital counter preset to count down from a number P the cycles of clock frequency passing through the gate during each counting interval, where $P=NTV+10^n f$ and $NTV \cong 10^n f$ and where $n$ is equal to the number of decimal places to which the frequency is to be read, said digital counter having decade counter tubes and corresponding indicator tubes, each with cathodes respectively corresponding to the digits in its decade, each cathode of an indicator tube having a grid controlled gas tube connected between it and a gate and having the grid of the gas tube excited by the corresponding cathode of the counter tube, said gate applying a voltage across the indicator tube and the associated gas tubes sufficient to fire the gas tube excited by the counter tube and to illuminate the associated cathode of the indicator tube, said voltage dropping after firing to a level sufficient to maintain the fired gas tube on and its associated cathode in the indicator illuminated but insufficient to fire any other gas tube even though its grid is excited by the counter tube.

4. In a digital counter having glow transfer decade counter tubes and corresponding indicator tubes, each with cathodes respectively corresponding to the digits in its decade, and a grid controlled gas tube connected between each cathode of the indicator tube and a gate and having the grid of the gas tube excited by the corresponding cathode of the counter tube, said gate applying a voltage across the indicator tubes and the associated gas tube sufficient to fire the gas tube having its grid excited by the glowing cathode of the counter tube and to illuminate the associated cathode of the indicator tube, said voltage dropping after firing to a level sufficient to maintain the fired gas tube on and its associated cathode in the indicator illuminated but insufficient to fire any other gas tube even though its grid is excited by a glowing cathode of the counter tube.

5. In a digital counter having glow transfer decade counter tubes and corresponding indicator tubes, each with cathodes respectively corresponding to the digits in its decade, and a grid controlled gas tube connected between each cathode of the indicator tube and a gate and having the grid of the gas tube excited by the corresponding cathode of the counter tube, said gate applying a voltage across the indicator tubes and the associated gas tube sufficient to fire the gas tube having its grid excited by the glowing cathode of the counter tube and to illuminate the associated cathode of the indicator tube, said voltage dropping after firing to a level sufficient to maintain the fired gas tube on and its associated cathode in the indicator illuminated but insufficient to fire any other gas tube even though its grid is excited by a glowing cathode of the counter tube, and said counter starting a succeeding count while the results of the preceding count are displayed on the indicator tubes.

6. In a digital counter having glow transfer decade counter tubes and corresponding indicator tubes, each with cathodes respectively corresponding to the digits in its decade, and a grid controlled gas tube connected between each cathode of the indicator tube and a gate and having the grid of the gas tube excited by the corresponding cathode of the counter tube, said gate applying a voltage across the indicator tubes and the associated gas tube first sufficient to quench any gas tubes which may be on and then sufficient to fire the gas tube having its grid excited by the glowing cathode of the counter tube and to illuminate the associated cathode of the indicator tube, said voltage dropping after firing to a level sufficient to maintain the fired gas tube on and its associated cathode in the indicator illuminated but insufficient to fire any other gas tube even though its grid is excited by a glowing cathode of the counter tube.

7. In a digital counter having a glow transfer decade counter tube with a cathode corresponding to each digit, a grid controlled gas tube associated with each cathode, means for storing the count on the counter tube during an interval in which a succeeding count may take place comprising a gate for applying a voltage across the gas tubes sufficient to cause firing of only the tube associated with a glowing cathode and then dropping the voltage to a level at which the fired tube will remain on but at which no other gas tube will fire even though its grid may be excited by the glowing of the associated cathode of the counter tube as part of the succeeding count.

8. The counter of claim 7 in which each gas tube is in series with a cathode of an indicator tube which glows when the gas tube is on and in which there are means for quenching the gas tube prior to applying the firing voltage.

References Cited in the file of this patent
UNITED STATES PATENTS

| | | |
|---|---|---|
| 2,616,627 | Holden | Nov. 4, 1952 |
| 2,872,619 | Davison et al. | Feb. 3, 1959 |